Sept. 2, 1941.  A. RYBA  2,254,625
ELECTROMAGNETIC MULTIPLE-DISK CLUTCH
Filed Nov. 24, 1937  2 Sheets-Sheet 1
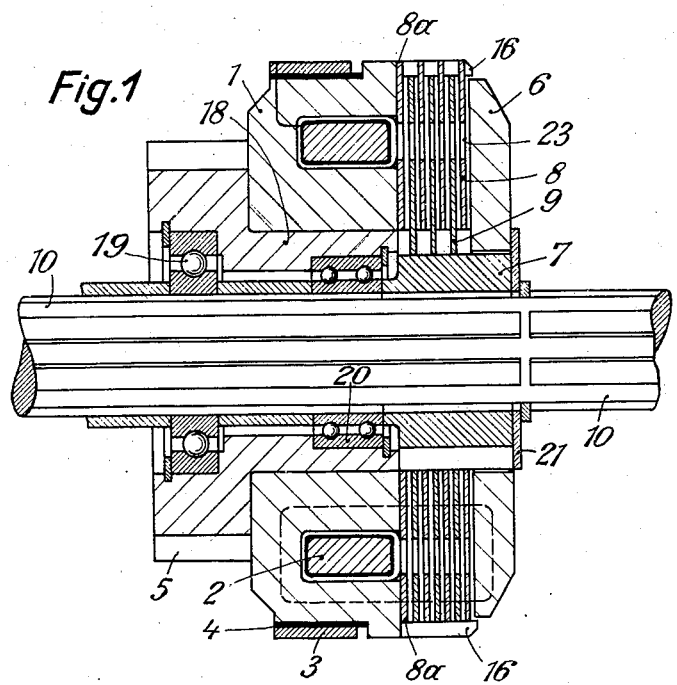
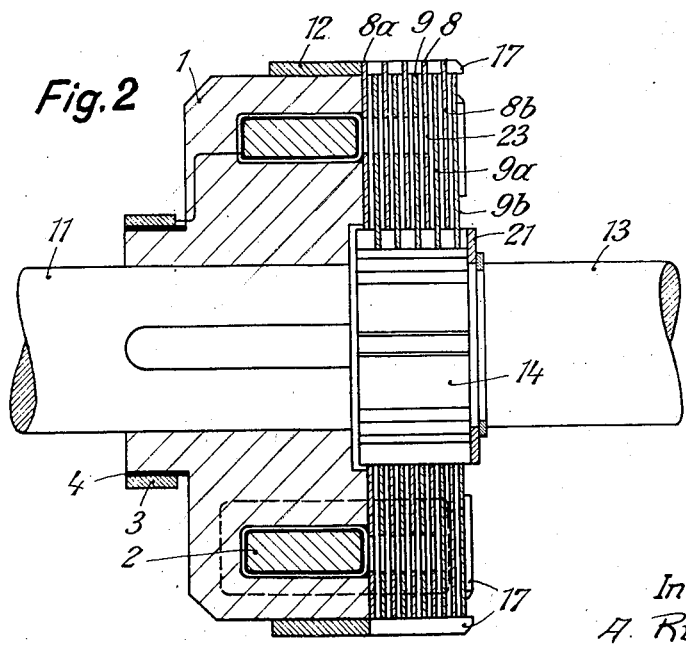
Inventor:
A. Ryba
By: Glascock Downing & Seebold
Attys.

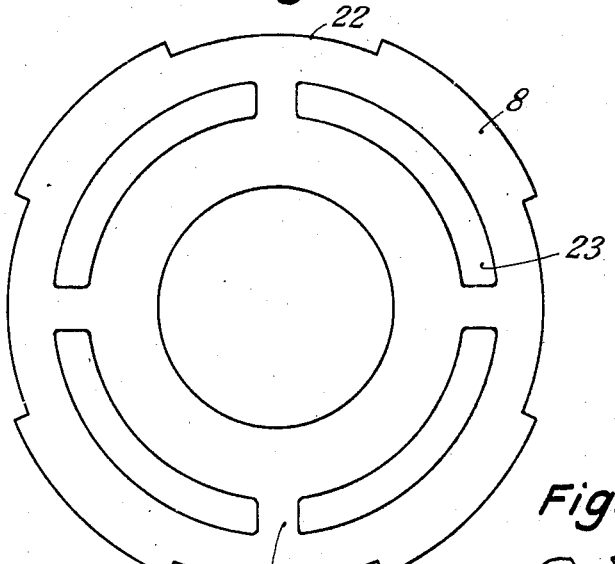
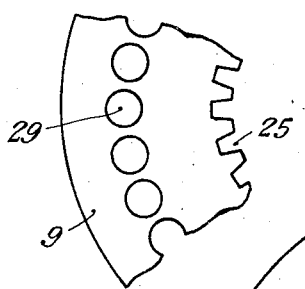
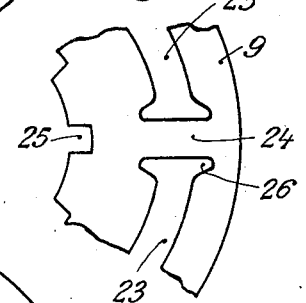
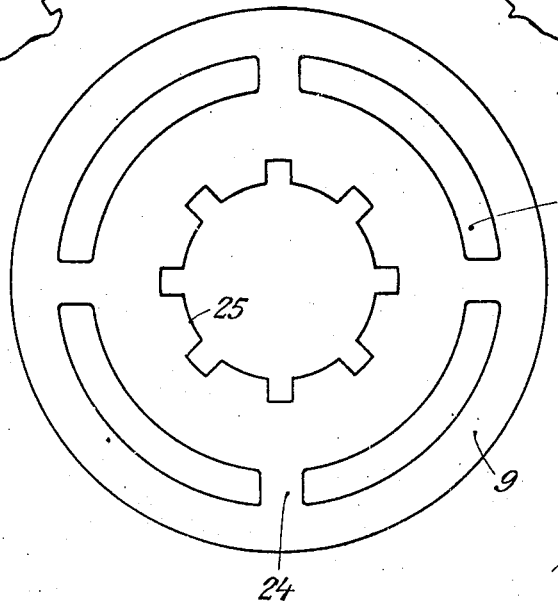
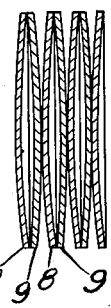
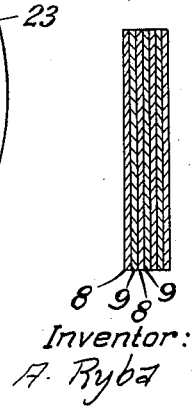

Patented Sept. 2, 1941

2,254,625

UNITED STATES PATENT OFFICE 2,254,625

ELECTROMAGNETIC MULTIPLE-DISK CLUTCH

Anton Ryba, Bolzano, Italy, assignor, by mesne assignments, to Societa Antonio Ryba a garanzia limitata, Bolzano, Italy Application November 24, 1937, Serial No. 176,339
In Germany November 24, 1936

3 Claims. (Cl. 192—84)

This invention relates to electromagnetic multiple-disk clutches, such as are used in motor vehicles for gear changing.

Clutches of this type were heretofore designed with a few comparatively thick disks. This design has the drawbacks that, with a size of the clutch practicable in motor vehicles, the power which can be transmitted is limited, and that the remanence is high, delaying the disengaging of the clutch.

An object of my invention is a multiple-disk clutch of high power-transmitting efficiency and a very considerably reduced remanence. I obtain this result by employing thin springy disks made of ferro-magnetic material as transmitting elements which will leave air-gaps between adjacent disks when de-magnetized but bear against each other when magnetized by yielding in response to the magnetic force due to their springiness, thus substantially eliminating the air-gaps.

Another object of my invention is to provide each disk with a circular zone of perforations, thus securing a flux flowing exclusively in axial direction through the disks.

The holes may be designed and arranged in various ways. Thus, they may be arcuate slots concentric to the axis of the clutch, so that the disk is subdivided into a central portion and an annulus surrounding the central portion in spaced relation, with radial bridges connecting the central portion and the annulus. Or a circular row of suitably dimensioned perforations may be arranged instead of the arcuate slots.

Disks of this kind are easily punched from a suitable piece of thin ferromagnetic sheet metal of any desired gauge, and initial elastic tension can be imparted to a set of disks by dishing them. This produces uniform wear, and uniform torque, and facilitates the disengagement of the clutch by the reaction of the disks.

The sections of the bridges between the arcuate slots, or between the perforations, make up together a section which is ample for imparting the required strength to the disks.

With many thin disks, the necessary electromotive force output is the same as with a few thin ones but the number of friction surfaces, and consequently the power transmission, is increased. If, however, the exciting current is switched off the disks will be forced apart on account of their springiness and elastic tension so that numerous air gaps are formed between adjacent disks. Since the magnetic resistance of air is many times higher than the resistance of the ferro-magnetic material used for the disks, the air-gaps opened in the path of the magnetic flux will weaken the remanence flux instantaneously to a very considerable extent; an effect which is further increased in that the bridges between the slots or perforations form short circuiting bridges for the remanence flux. If the exciting current is switched on the disks will yield to the magnetic pressure due to their springiness and bear against each other thus gradually eliminating the air-gaps between adjacent disks. As a result, the magnetic force will rapidly increase since the magnetic resistance of the path of the magnetic flux is rapidly reduced by the gradual elimination of the air-gaps offering a high magnetic resistance.

In the accompanying drawings, several clutches and types of disks embodying the invention are illustrated by way of example.

In the drawings

Fig. 1 is an axial section of a clutch with disks having arcuate slots, for connecting a pinion to an undivided shaft, Fig. 2 is an axial section of a clutch with similar disks but designed for connecting two axially aligned shafts, Fig. 3 is an elevation of an outer disk, i. e., one operatively connected to the clutch member supporting the electromagnet, Fig. 4 is an elevation of an inner disk, i. e., one operatively connected to the other clutch member, Fig. 5 is a part elevation of an inner disk in which extensions are arranged at the ends of the arcuate slots shown in Fig. 4.

Fig. 6 is a part elevation of an inner disk with a circular row of perforations instead of arcuate slots, Fig. 7 shows schematically the positions of several adjacent disks when de-magnetized, and Figure 8 shows the same disks when under the influence of the magnetic force.

Referring now to the drawings, and first to Figs. 1 to 4, a pinion 5, Fig. 1, is mounted for free rotation about a splined shaft 10 by means of an elongated boss or sleeve 18, a ball bearing 19, and a ball or roller bearing 20. Keyed on the sleeve 18 is an annular electromagnet 1 with an exciting coil 2 housed therein. Current is supplied to the coil from a collector ring 3 placed on an insulating layer 4 on the electromagnet through a suitable conduit. The pinion and the electromagnet make up one of the clutch members. The other clutch member is a splined bush 7, of non-magnetic material, seated on the serrations of shaft 10. 6 is an end plate which is mounted to slide on the bush 7, and 21 is an abutment for the end plate.

In the clutch illustrated in Fig. 2, the electromagnet 1 is keyed directly on a shaft 11 and the bush 7 is replaced by a splined member 14 on the inner end of a shaft 13 which is axially aligned with the shaft 11.

The disks which are similar in both clutches, will now be described. 8, Fig. 3, are the outer disks which are operatively connected to the electromagnet 1 by projections 16 from the face of the electromagnet, Fig. 1, or by the teeth 17 of a ring 12 of non-magnetic material placed on the electromagnet, Fig. 2, engaging between lugs on the perimeter of the outer disks defining gaps 22, Fig. 3. The inner disks 9, Fig. 4, have splines 25 on their inner perimeter for engaging between the splines of the bush 7, Fig. 1, or of the member 14, Fig. 2. Inner and outer disks are arranged alternately, and preferably the first disk of the unit which is an outer disk 8a, is placed against the face of the electromagnet 1 to protect the comparatively soft material of the magnet against abrasion.

The disks illustrated in Figs. 3 and 4 comprise a central portion, an annulus separated from the central portion by arcuate slots 23, and locally connected to the central portion by bridges 24. The total cross-section of the bridges 24 must be so determined that the disk is not unduly weakened by the arcuate slots 23.

Extensions 26, Fig. 5, may be provided at the ends of the arcuate slots 23, as shown for an inner disk 9. The extensions increase the springiness of the disks. Instead of arcuate slots, a circular row of perforations 29 may be made in the disks, as shown for an inner disk 9 in Fig. 6, it being understood that obviously similar arrangements can be provided for the outer disks 8.

Part of the disks may be solid, i. e., without slots or other apertures. By way of example, Fig. 2 shows a set of apertured disks 8 and 9, and a set of solid disks replacing the end plate 6, Fig. 1, and including two inner disks 9a and 9b, and an outer disk 8b.

When current is supplied to the coil 2 and the electromagnet 1 is excited, a closed magnetic flux is established as indicated by the dotted lines in Figs. 1 and 2 which twice traverses the disks 8 and 9 at opposite sides of their slots, or other apertures, and flows through the end plate 6 in Fig. 1, or through the first solid disk 9a in Fig. 2. Part of the flux is prematurely closed through the bridges 24, or similar parts, of the disks.

When the electromagnet 1 is de-energized by interrupting the supply of current, three factors counteract the remanence, viz.: The many subdivisions of the set of disks which are produced by their thinness; the springiness of the disks which may be enhanced by dishing them, or by providing the extensions 26 at the slots 23, Fig. 5; the derivation of the remanence flow principally by the disk 8a which is placed against the electromagnet 1, as described. This disk contributes essentially to the reduction of the remanence.

Figures 7 and 8 illustrate the effect of the magnetic force on the relative positions of disks 8 and 9. Due to their springiness which may be increased by dishing these disks tend to assume the positions shown in exaggeration in Figure 7 in which gaps are left between adjacent disks. Since the magnetic resistance of air is very high as compared with ferro-magnetic material, a magnetic path including such air-gaps will offer a high magnetic resistance and consequently the remanence flux will be very low. If the exciting current is switched on a magnetic field will be built up which will result in a certain contraction of the parcel of disks and a gradual closing of the air-gaps. As soon as this process is initiated, the resistance of the magnetic path will rapidly decline since with each eliminated air-gap its resistance is substantially reduced. The axial pressure of the magnetic force will rapidly increase and the disks will reach the positions shown in Figure 8 in which they bear against each other.

Obviously, instead of connecting a pinion to a single shaft, the clutch can be employed for connecting two axially aligned shafts, as in Fig. 2. Any number of gaps 22 and any number of splines 25 may obviously be provided in the inner and outer rings.

I claim:

1. In an electromagnetic multiple-disk clutch, a pair of clutch members, an electromagnet on one of said clutch members, and thin springy disks made of ferromagnetic material alternately operatively connected to the respective clutch members, said disks leaving air gaps between two adjacent disks when demagnetized and adapted to bear against each other by yielding in response to the increasing axial pressure of the magnetic force due to their springiness thus substantially eliminating said air gaps, each disk defining perforations in circular arrangement about the axis of the clutch.

2. In an electromagnetic multiple-disk clutch, a pair of clutch members, an electromagnet on one of said clutch members, an outer set of thin springy disks made of ferromagnetic material, teeth on the outer perimeter of each disk in the outer set for connecting such disks to the member with the electromagnet, an inner set of thin springy disks made of ferromagnetic material, the disks of the inner set alternating with the disks of the outer set, and teetth on the inner perimeter of each disk in the inner set for operatively connecting them to the other clutch member, said disks of said inner set and said outer set leaving air gaps between two adjacent disks when demagnetized and adapted to bear against each other by yielding in response to the increasing axial pressure of the magnetic force due to their springiness thus substantially eliminating said air gaps, each disk in each set defining perforations in circular arrangement about the axis of the clutch.

3. In an electromagnetic multiple-disk clutch, a pair of clutch members, an electromagnet on one of the clutch members, a splined bush made of non-magnetic material forming part of the other clutch member, an outer and an inner set of thin springy disks made of ferromagnetic material, teeth on the outer perimeter of each disk in the outer set for connecting such disk to the clutch member with the electromagnet, teeth on the inner perimeter of each disk in the inner set for connecting such disk to the splined bush, said disks of said inner set and said outer set leaving air gaps between two adjacent disks when demagnetized and adapted to bear against each other by yielding in response to the increasing axial pressure of the magnetic force due to their springiness thus substantially eliminating said air gaps, each disk in each set defining a set of holes in circular arrangement about the axis of the clutch, and an end plate mounted to slide on the splined bush.

ANTON RYBA.